June 8, 1954

H. McK. McLEARN 2,680,590

ARTICLE-PACKING DEVICE

Filed Oct. 31, 1952

INVENTOR.
HERBERT M. McLEARN
BY
ATTORNEY

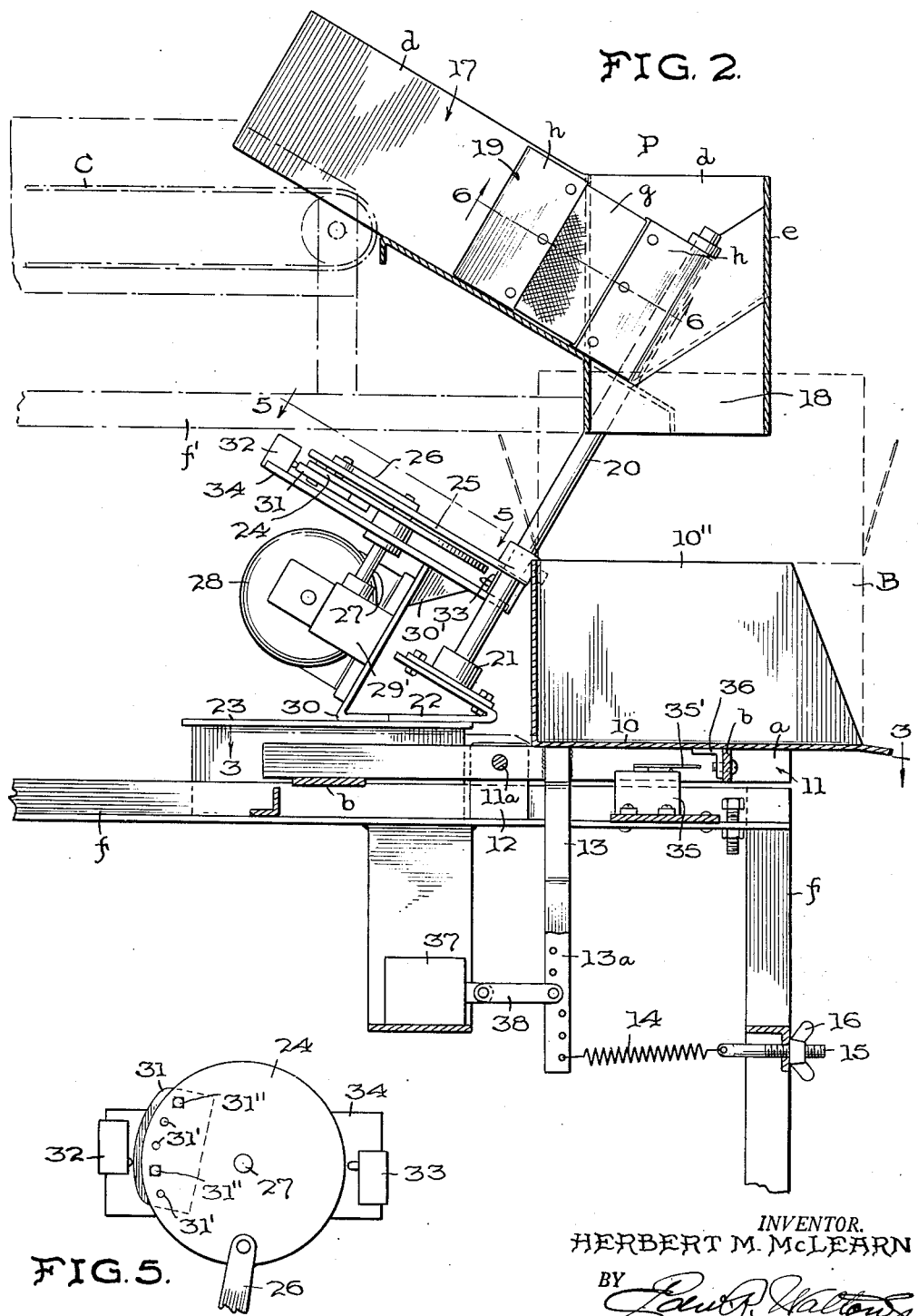

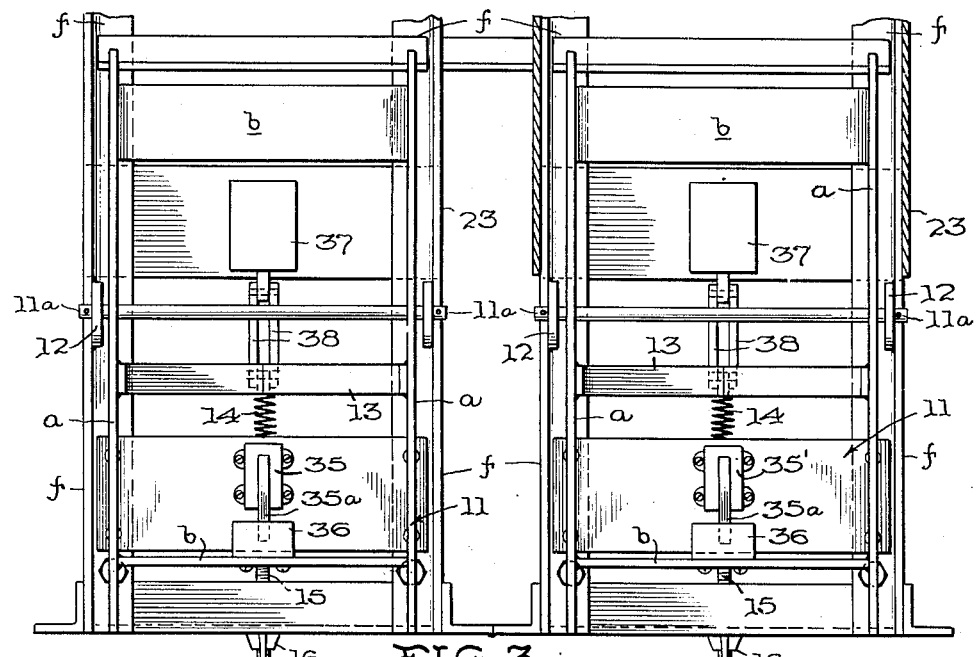
FIG. 3.
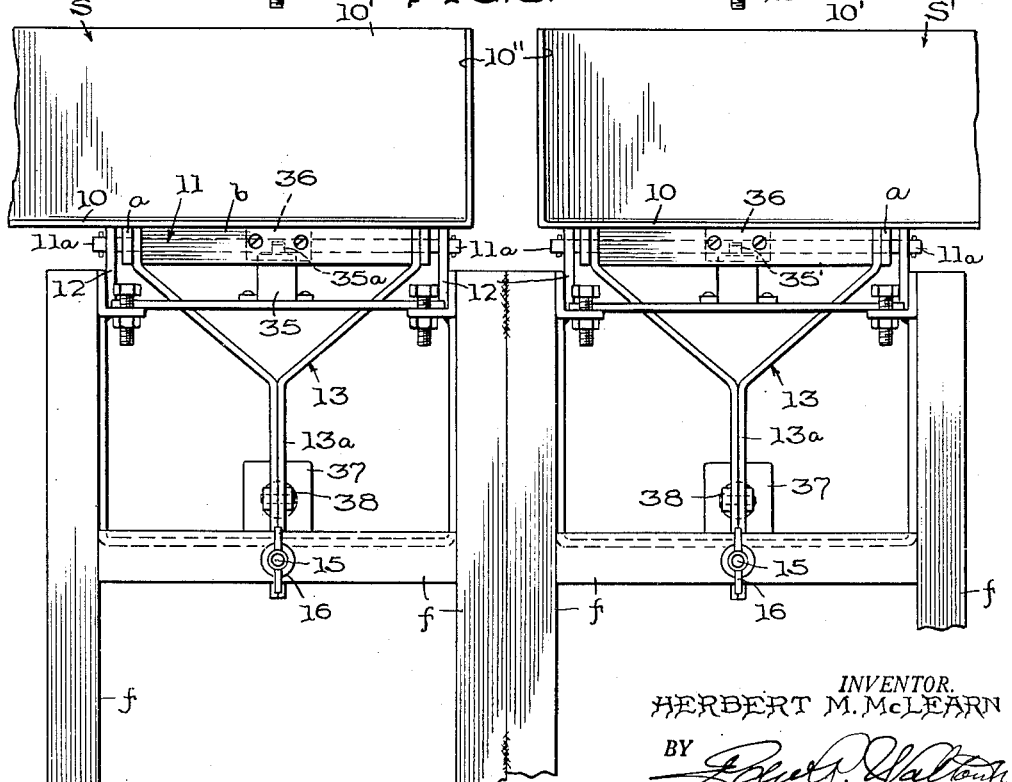
FIG. 4.
INVENTOR.
HERBERT M. McLEARN
BY
ATTORNEY June 8, 1954   H. McK. McLEARN   2,680,590
ARTICLE-PACKING DEVICE
Filed Oct. 31, 1952   4 Sheets-Sheet 4

INVENTOR.
HERBERT M. McLEARN
ATTORNEY

Patented June 8, 1954

2,680,590

UNITED STATES PATENT OFFICE 2,680,590

ARTICLE-PACKING DEVICE

Herbert McKinney McLearn, near Maitland, Fla., assignor to American Machinery Corporation, Fairvilla, Fla., a corporation of Florida Application October 31, 1952, Serial No. 318,019

7 Claims. (Cl. 249—57)

1

The present invention relates to improvements in packaging devices for fresh fruits and vegetables and the like.

In the packaging of fresh fruits and vegetables, that have been washed or otherwise treated prior to shipment to market or which may be packaged prior to being offered on the market, said fruits and vegetables are progressively moved from a bulk source of supply, by a conveyor belt or other type of conveyor means, to a point where they are discharged into a bag or box. In order that the normal progressive flow of the product may not be interrupted during the packaging, it has been manually diverted from one container to another after one container has been filled with the proper quantity or amount of the product.

The broad object of the present invention is to provide an improved very simple and relatively inexpensive packing device that will automatically and successively divert the flow of fresh fruits and vegetables to another container as soon as the container being filled has received from said flow of the product an amount thereof ac-according to a preselected weight, without interrupting the flow of the product.

A more specific object of the present invention is the provision of a packing device for fruits and vegetables that has improved and simplified weighing units that support containers into which the products may flow alternately and means for automatically diverting said products from one weighing unit to another when a preselected weight has been attained by one of said units, which, thereafter, becomes inoperative to divert the flow of said products until said other weighing unit has received its full preselected weight of said products and has again caused said diversion.

Other objects and features of the invention will be apparent from the following detailed description.

The invention resides in the construction of and combination and organization of the instrumentalities hereinafter more fully described and illustrated, by way of example, in the accompanying drawings and more particularly pointed out in the appended claims.

In the drawings which show several forms of the invention that have been marketed:

Figure 2 is a vertical sectional view taken substantially on line 2—2 of Figure 1;

Figure 3 is a horizontal sectional view taken substantially on line 3—3 of Figure 2 showing in plan the scale weighing units but without their trays;

2

Figure 1:
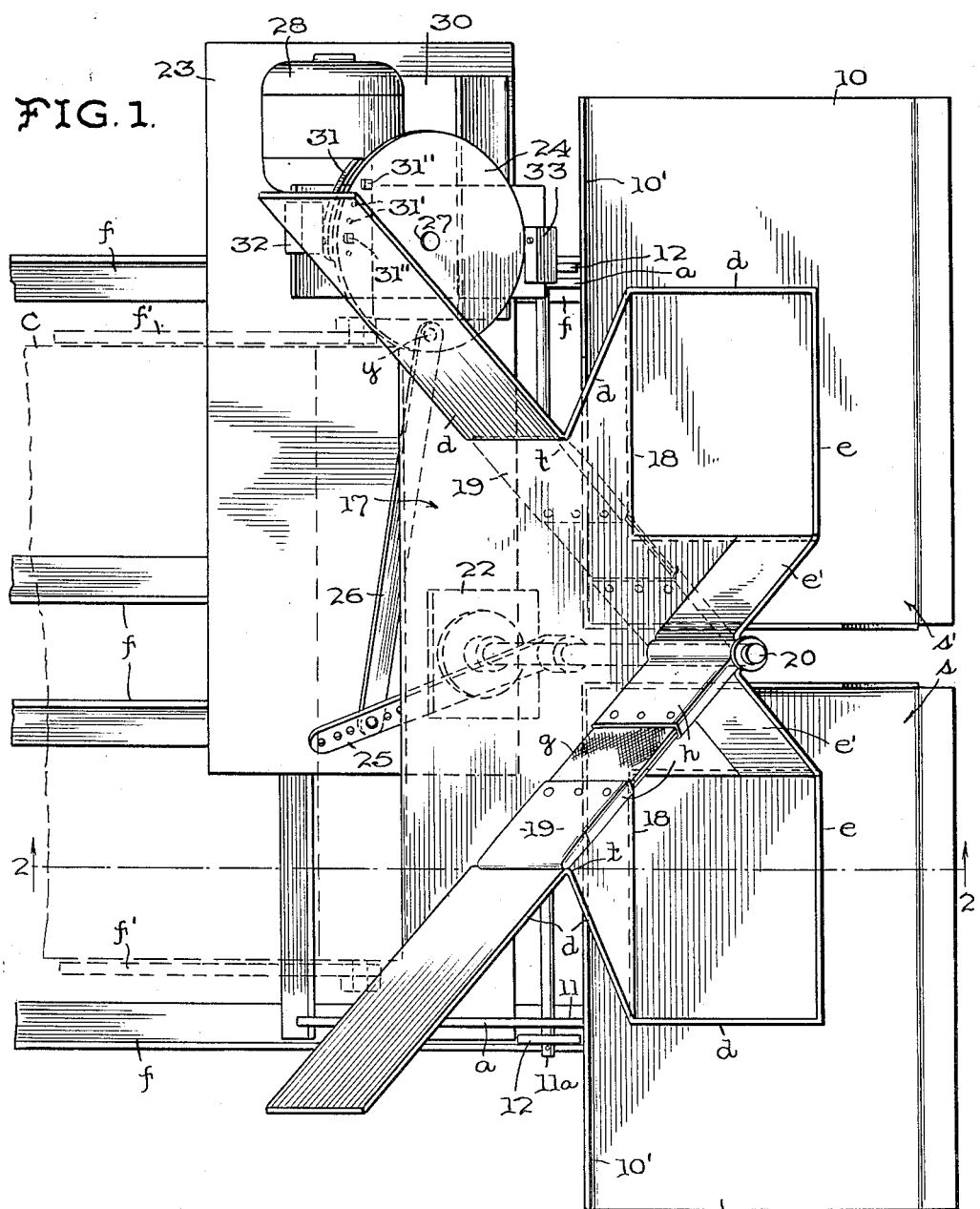
Figure 1 is a top plan view of the invention in a form to be applied at the discharge end of a conveyor.
Figure 6:
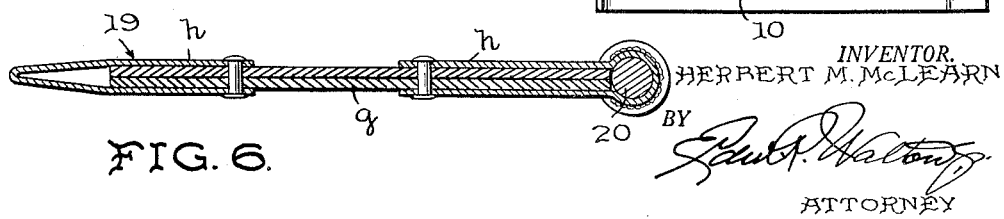
Figure 7:
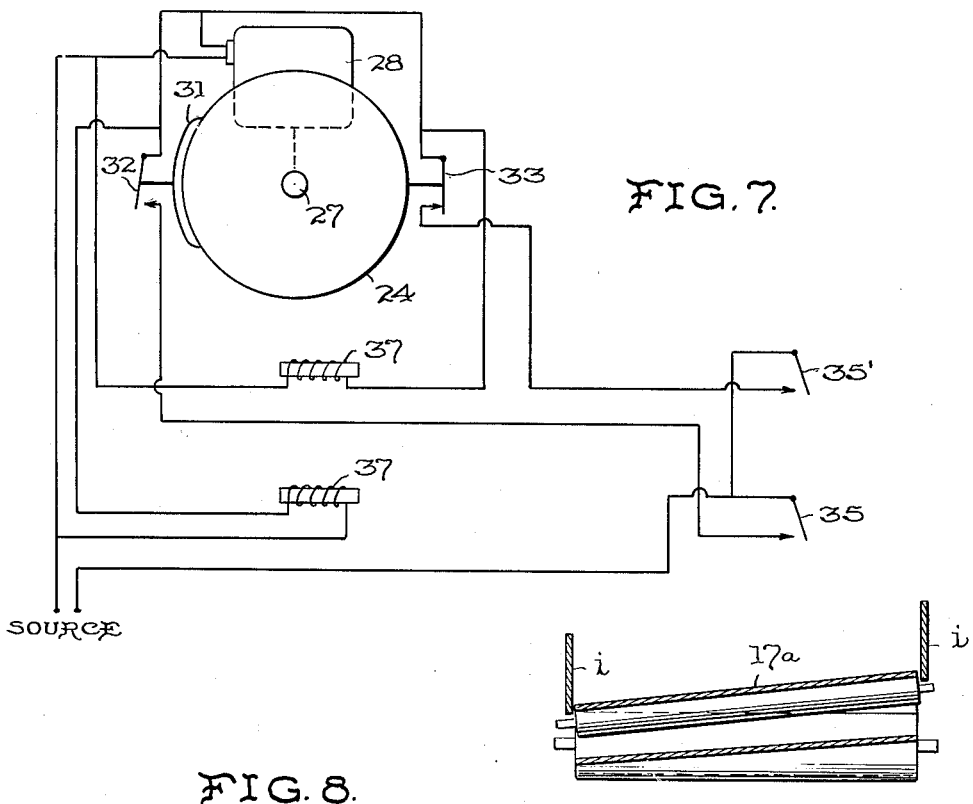
Figures 8, 9:
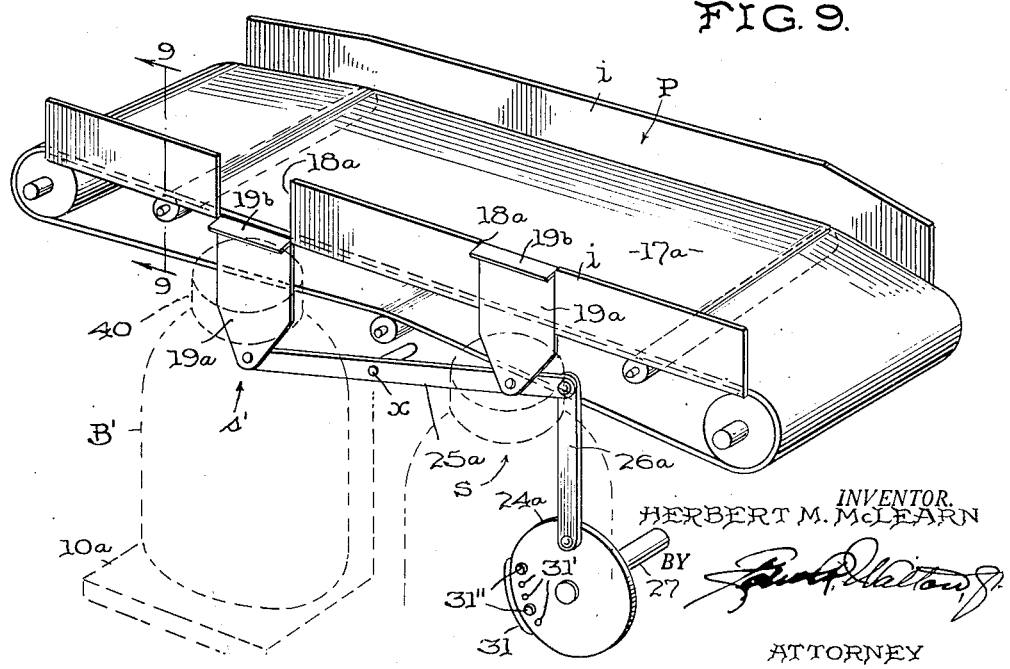

Figure 4 is a front elevation of the weighing units shown in Figure 3 and having the trays thereon;

Figure 5 is a top plan view of diverter control and actuating member or disc and taken substantially on line 5—5 of Figure 1;

Figure 6 is a horizontal sectional view taken substantially on line 6—6 of Figure 2 and showing the detailed construction of the diverter;

Figure 7 illustrates a wire diagram of a control circuit for the invention;

Figure 8 is a perspective view of a modified form of means for diverting the products from a conveyor to said weighing units; and Figure 9 is a transverse sectional view taken substantially on line 9—9 of Figure 8.

Throughout the specification and drawings, like characters of reference refer to similar and like parts.

Referring particularly to Figures 1 to 7, inclusive, of the drawings, a form of the packing device P of this invention is shown that is adapted to be applied along a discharging side or discharging end of a conveyor, but is herein illustrated as positioned at the elevated discharge end of an endless conveyor C so as to receive the articles (fruit or vegetables or the like) being conveyed thereto. The packing device is supported by a framework $f$ that may rest directly upon the ground or floor or may be attached to the supporting frame $f'$ of the conveyor C, as desired.

The packing device P has, at least, two adjacent packing and weighing stations $s$ and $s'$, preferably arranged side-by-side, to which the articles or produce, being discharged from the conveyor C for packing, are alternately diverted. Each of the stations $s$ and $s'$ comprises identical weighing scale units carried on the frame $f$ and, therefore, a description of one will suffice for the other.

Each weighing scale unit comprises a tray or weighing platform 10 positioned under a point of discharge of the articles, to be packaged, and mounted on the forward end of a horizontally disposed rigid balance-frame 11 pivoted intermediate its ends to a bracket plate 12 on the supporting frame $f$ by horizontal pivots 11$^a$. The balance-frame 11 may be of any desired construction but is here shown as composed of two spaced and substantially coextensive and parallel side-bars $a$ connected at their opposite ends by cross-bars $b$. Rigidly secured to and depending from opposite side-bars $a$, at a point under the platform 10 (preferably near the pivot 11$^a$), is a substantially Y-shaped yoke member 13 having its lower stem or arm 13$^a$ connected to one end of a tension scale-spring 14 extending laterally relative to the arm 13$^a$. The other end of the spring 14 is secured to an eye-bolt 15 extending through an adjacent fixed portion of the supporting frame f at the front of the device and adjustable through means of a wing-nut 16 threaded thereon bearing against the surface of the framework f. Obviously with this arrangement, the spring 14 applies counter balancing force to balance frame 11 and, by threading the wing-nut 16 on the bolt 15, the tension of the spring 14 may be increased and diminished, as desired, to attain varying weights or amounts of the articles, being packed, upon the tray or platform 10 before the balance frame 11 will tilt downwardly under the load.

Disposed above the weighing stations s and s' and supported from framework f is a chute member 17 formed and positioned to receive the articles, to be packed, from the discharge end of the conveyor C. This chute member comprises a bottom wall c, upstanding side walls d and a front wall e, as shown particularly in Figures 1 and 2. The bottom wall c is formed at its lower or front portion with two laterally spaced discharge openings or passages 18 of considerable area and each is arranged to overlie the platform 10 of the two weighing units, respectively, so as to discharge into a suitable container or box supported upon each of the platforms 10. The front of said openings 18 and their outer sides are defined by the front walls e and side walls d, respectively, the side walls d converging rearwardly from the openings 18 for a distance to provide a restricted passage or throat t, about midway the length of the chute 17, and from this point of divergence upwardly and rearwardly of the chute the side walls d diverge to act as gathering and guide members for the articles being delivered from the conveyor c onto the upper and rear end of the chute 17.

As above stated, the articles to be packed are delivered alternately to said weighing units at stations s and s'; and, to this end, a swingable diverter gate 19 is positioned in the path of the articles moving down the chute 17 and mounted between the openings 18 so as to swing from side to side of the throat t and, thereby, divert the articles moving down the chute 17 to one opening 18 or the other.

The gate 19, preferably, comprises several plies or layers of belting material g having their end portions faced with sheet metal h and leaving a flexible intermediate portion (see Figures 2 and 5). One end of the gate 19 is fixedly secured to an oscillatable shaft 20 extending upwardly through medial center of the chute between the openings 18 and substantially normal to its bottom wall c. It will be seen that the gate 19 is of a length to extend from the shaft 20 so that its distal end will contact either side of the throat t and form a continuation of the adjacent diverging portion of side wall d, the gate 19 being substantially of the same height as the side walls d. The intermediate portion e' of the front wall e of the chute 17, between the discharge openings 18, is substantially V-shaped and extends inwardly with its wall surfaces converging to the shaft 20, thereby forming guide walls, which are extensions of the gate 19, when the latter is in its respective diverting position, so as to assist in guiding the articles on the chute to one of the openings 18 while, at the same time, the gate obstructs passage of the articles to the other opening 18.

The shaft 20 is, preferably, journalled at its lower end in a bearing 21 fixedly secured to one leg of an angular bracket 22 secured to a face plate 23 mounted on the frame f and positioned above the rear end of the balance-frame 11 (Figure 2).

The shaft 20 is oscillated, to alternately shift the position of the gate 19, by means of a crank and pitman arrangement which may take the form of a rotatably mounted disc 24 connected to a rocker arm 25, fast on the shaft 20, through means of a pitman or connecting rod 26 pivotally connected at one end to said rocker arm and pivotally connecting at its other end to a marginal peripheral portion of the disc 24. The axial center of the disc 24 is fixedly secured to the upper end of a shaft 27 which is driven by an electric motor 28 through a reduction-gearing 29, the motor and reduction-gearing being mounted on an angular bracket 30 which, in turn, is mounted on the base plate 23 carried by the frame f.

The swinging movement of the gate 19 to divert the flow of the products, to be packed, from one station s or s' to the other is effected, according to this invention, by the weighing units themselves after the container, being filled at one weighing station, has received its proper or required weight of such articles. This is accomplished by providing a segmental cam 31 on the underside of one portion of the disc 24 (see Figures 1, 2 and 5), having its outer edge portion positioned to alternately engage and control two normally closed switches 32 and 33 as the disc is rotated. The switches are mounted, preferably, on substantially diametrically opposite sides of the disc 24 and are supported by a plate 34 positioned under the disc 24 (through which the shaft 27 may rotatably extend) and held in position by brackets 30' secured to bracket 30. The cam 31 may be in the form of an adjustable plate having a series of openings 31', registerable with similar openings on the disc 24, and held in position by bolts 31'', the arrangement being that the arcuate cam edge of the plate 31 may be adjusted circumferentially of the disc 24 for a slight distance and will alternately open the switches 32 and 33 which are biased to normally close when not engaged by the cam plate 31. Normally open micro-switches 35 and 35' are disposed under the platform 10 of each weighing unit s or s', respectively, and mounted on the frame f to be engaged by a cooperating lug 36, mounted on the forward cross-bar b of each balance-frame 11, when the proper weight of articles has been accumulated on the platforms 10 from the overlying opening 18 of the chute 17.

As one of the balance-frames 11 moves downwardly, it closes its starter switch 35 or 35', which latter are, respectively, in series in an electrical circuit (see Figure 7) with one of the normally closed control switches 32 or 33, respectively, and completes the circuit to the motor 28, which then causes the disc 24 to rotate moving the cam 31 out of engagement with one of said switches 32 or 33; and, when the disc has moved the cam about one-half revolution, the cam will have opened the other switch 32 or 33 (which caused the operation of the motor 28), thus breaking the circuit to the motor and stopping the operation of the disc. The cam surface of the cam 31 is formed with sufficient length to allow for over-ride of the motor 28 because, when the cam 31 breaks the circuit through either 32 or 33, the momentum of the motor 28 will cause the disc to continue its movement for about 10° and, therefore, it is necessary to have the cam face long enough to hold said switch open until the motor has completely stopped.

From the above stated operation and with the parts in their full-line position, as shown, it will be clear that, when the container B on weight station s' has been properly filled, starter switch 35' is closed closing a circuit through control switch 33 to the motor 28 which rotates disc 24 causing gate 19 to swing from its full-line position to its dotted-line position (Figure 1), thus causing a diversion of the articles, to be packed, from the opening 18 above the weighing station s' to the opening 18 above weighing station s; and the mechanism of weighing station s' is now rendered inoperative to cause further operation of the motor 28, due to the cam 31 having opened its corresponding control switch 33, until the cam 31 has been moved to out of contact with switch 33 and allowed it to close, which occurs when the container on the platform of station s has been filled sufficiently to cause its starter switch 35 to close the circuit to the motor 28 through control switch 32 (now closed), at which time a reverse cycle of operation occurs.

In order to avoid fluttering of the starter switches 35 and 35' when the balance-frames 11 are depressed, by the proper weight having been accumulated thereon, each of said starter switches has in circuit therewith a solenoid 37 whose core or armature is connected by link 38 to the yoke member 13 of its unit; and as soon as the contact lug 36 engages the switch arm 35ª of said switches to close the same, the first impulse of such closing of said switches causes its solenoid 37 to operate and draw upon the yoke 13 to bring the balance-frame 11 downwardly causing the lug 36 to move in positive engagement with the switch arm 35ª and hold the switch in definite closed contact.

As shown particularly in Figures 1 and 2, each platform 10 may be provided with upstanding back wall 10' and one upstanding side wall 10" so as to receive the box D, the top flaps of the box being held open by engaging downwardly projecting extensions of the walls e and d which define the overlying discharge openings 18.

The position and location of the gate 19, as shown in Figures 1 and 2, do not allow for too accurate measurement as to exact weight of the products delivered to each container because of the distance of the gate from the containers themselves resulting in overweight; and, while this can be generally compensated by adjustment of the nut 16 to vary the tension of the counterbalance spring 14, it is not objectionable because it follows customary practice, in packing of fresh fruits and vegetables, of giving overweight to allow for shrinkage and spoilage in storage and/or transit.

A more accurate weighing is obtainable with the form of the invention shown somewhat schematically in Figures 8 and 9 wherein the packaging device P' consists of an endless conveyor 17ª upon which the articles to be packed are delivered (usually from other conveyor means in a production line, such as C in Figures 1 and 2). The conveyor 17ª is mounted to have its upper or bearing flight tilted transversely (see Figure 9) and is equipped with guide-rails or side-boards i disposed adjacent the longitudinal edges of said upper flight of the conveyor 17ª. Thus, it will be seen that the articles on the upper flight of the conveyor 17ª will gravitate, as they are being progressed on the conveyor 17ª, toward its lower sideboard i which has two spaced discharge openings 18ª therein controlled by vertically sliding gates 19ª respectively. These gates are connected by a lever 25ª, pivoted intermediate its ends at x, and oscillated thereabout by a pitman rod or link 26ª pivotally connected, by a crank pin y to the peripheral marginal portion of the disc 24ª, similar in all respects to and operated in the same manner as the disc 24 shown in Figures 1 and 2. By this arrangement the gates 19ª are alternately opened and closed to allow the objects or articles, to be packed, to flow alternately through either one of the discharge openings 18ª that is opened. The upper edge of each of the gates 19ª is formed with an outwardly and downwardly extending lip 19ᵇ for the purpose of providing a short directing chute and, further, for the purpose of not presenting a sharp edge to the articles passing through the openings 18ª.

The weighing platform 10, as shown in Figures 1 and 2, may be positioned under the openings 18ª so that any box supported thereon may have its upper edge directly under the chute 19ᵇ of the gates 19ª when they are opened, or alternately, a bag supporting ring 40 may be secured to the side board i immediately under each of the openings 18ª, respectively, so as to hold the opened end of a bag B' with its bottom resting upon weighing platforms 10ª of the weighing units s and s' respectively, which weighing units are of the same construction and function in the same manner as previously described and control the operation of the disc 24ª in exactly the same manner as the disc 24 previously described. This type of packing device P' may be employed when a greater amount of accuracy in weighing is desired because when the gates are closed there is less of the product in suspension between the gate and the platform of the weighing units.

Manifestly, the packing device of either of the forms of the invention herein shown and described will require only one attendant because while one container is being filled, the already filled container can be removed and another empty container replaced for it. The principles of this invention are readily adaptable to fully automatic packing devices, but the specific devices shown herein are purposely devised for the intermediate and small packing operations such as by small packing houses, wholesalers and distributors and have supplied a great need herein.

Having thus described the invention and the manner in which it is to be performed, it is to be understood that the invention is not to be limited to the exact form and construction herein shown and described as the same is susceptible to many variations and modifications and the invention is only to be limited to the spirit thereof and the scope of the appended claims.

What is claimed as new, is:

1. In a packing device, the combination with an article collector having two discharge passages and means for alternately diverting the discharge of said article from one of said passages to the other, separate weighing units adapted to support containers and positioned to receive articles discharged from each of said passages, respectively, of an electrical motor means having an actuating connection with said diverting means for automatically changing the position thereof, an electrical control system operatively connected to said motor and including normally biased open electrical switches one for each weighing unit and positioned to be closed by its weighing unit, when a predetermined load has accumulated on said weighing unit, and including spaced and normally biased closed switches one for each weighing unit and in series with each of said normally open switches respectively, and an actuator carried by said actuating connection between said motor and said diverting means and positioned to alternately open said normally closed switches, whereby one weighing unit, when it has received its pre-determined load of articles, actuates said diverter means and becomes inoperative to divert the flow of articles until said other weighing unit has received its full pre-determined weight of said articles.

2. The subject-matter set forth in claim 1 wherein each weighing unit comprises a pivoted horizontally disposed balance-frame, means supporting said balance frame, a depending stem rigid on said balance frame and projecting from a distal side thereof, a tension spring connecting said stem to said supporting means and arranged to be expanded by the movement of said stem, when a weight load is placed on said balance-frame, and means for adjusting tension of said tension spring.

3. The subject-matter set forth in claim 1, wherein there is means associated with each weighing unit and actuated by said control system and positioned and arranged to draw and hold said unit in position to maintain its said normally open switch closed, when said switch has been once closed thereby until its normally closed control switch is opened, whereby fluttering of the weigh unit its normally open switch is prevented.

4. The subject-matter set forth in claim 1 wherein solenoids are connected to the weighing elements of each weighing unit respectively and electrically connected in said control system and positioned to draw and hold their respective units in position to be energized to maintain its said normally open switch closed, when said switch has been once closed thereby until its normally closed control switch is opened.

5. In a packing device, the combination with an article collector having two discharge passages and means for alternately diverting the discharge of said articles from one of said passages to the other, separate weighing units adapted to support containers and positioned to receive articles discharged from each of said passages, respectively; of a rotatable member having a pitman rod connection with said diverter means and having a cam surface thereon, motor means for rotating said member, a control system operatively connected to said motor for starting and stopping the same and including therein normally biased open electric switches one for each weighing unit and positioned to be closed by its unit, when a predetermined load has been accumulated thereon, and including a normally closed switch for each weighing unit in series with each of normally open switches, respectively, said normally closed switches being positioned to be sequentially opened by said cam surface on said rotatable member, whereby one weighing unit, when it has received its pre-determined load of articles, actuates said diverter means and becomes inoperative to divert the flow of articles until said other weighing unit has received its full pre-determined weight of said articles.

6. In a packing device, the combination of an article collector chute having two spaced discharge passages transversely positioned in the line of flow of articles over said chute, an oscillatible gate mounted at one end between said discharge passages for alternately diverting the flow of said articles over said chute from one of said passages to the other, a shaft upon which said gate is mounted, weighing units positioned to receive articles discharged from each of said passages, respectively, an electric motor for oscillating said shaft including a crank and pitman connection therebetween, said crank member having a cam surface thereon, and an electrical control system operatively connected to said motor for starting and stopping the same and including therein normally biased open electric switches one for each weighing unit and positioned to be closed by its unit, when a predetermined load has been accumulated thereon, and including a normally closed switch for each weighing unit in series with each of normally open switches, respectively, said normally closed switches being positioned to be sequently opened by said cam surface on said crank member, whereby one of said units, when it has received its predetermined load of articles, actuates said diverter means and becomes inoperative to divert the flow of articles until said other weighing unit has received its full predetermined weight of said articles.

7. In a packing device, the combination of a transversely inclined conveyor means arranged to have articles, to be packed, conveyed thereover longitudinally and having a longitudinally disposed side-board along its lower side portion, said side-board having spaced discharge openings therein along its length, vertical slidable gates mounted on the device to open and close said openings respectively, a weighing unit disposed adjacent each of said openings respectively and each adapted to support a container to receive said articles discharged from its adjacent opening, means for opening and closing at least two of said openings alternately and including a lever means connected to said gates, a motor means operating said lever means and including a crank and pitman connection therebetween, said crank member having a cam surface thereon, and a control system operatively connected to said motor for starting and stopping the same and including therein normally biased open electric switches one for each weighing unit and positioned to be closed by its unit, when a predetermined load has been accumulated therein, and including a normally closed switch for each weighing unit in series with each of normally open switches, respectively, said normally closed switches being positioned to be sequently opened by said cam surface on said rotatable member, whereby, when a predetermined load of articles has been delivered to one weighing unit, said diverter means is actuated to divert said articles to the other weighing unit and does not become effective to again actuate said diverter means until the other weighing unit has received its predetermined load.

References Cited in the file of this patent

UNITED STATES PATENTS

| Number | Name | Date |
|---|---|---|
| 321,209 | Gladish | June 30, 1885 |
| 392,344 | Kendrick | Nov. 6, 1888 |
| 561,742 | Welbourn | June 9, 1896 |
| 1,010,308 | Palmer | Nov. 28, 1911 |
| 2,016,204 | King et al. | Oct. 1, 1935 |
| 2,610,020 | Peterson | Sept. 9, 1952 |
| 2,625,361 | Schrock | Jan. 13, 1953 |